United States Patent

Samantaray et al.

(10) Patent No.: US 10,599,648 B2
(45) Date of Patent: Mar. 24, 2020

(54) OPTIMIZED STORAGE SOLUTION FOR REAL-TIME QUERIES AND DATA MODELING

(71) Applicant: Applied Materials, Inc., Santa Clara, CA (US)

(72) Inventors: Jamini Samantaray, San Ramon, CA (US); Pramode Kumar Sutrave, Phoenix, AZ (US); Jigar Bhadriklal Patel, Peoria, AZ (US); Thomas Bowyer, Mesa, AZ (US); Muthukumar Ramalingam, Phoenix, AZ (US)

(73) Assignee: APPLIED MATERIALS, INC., Santa Clara, CA (US)

( * ) Notice: Subject to any disclaimer, the term of this patent is extended or adjusted under 35 U.S.C. 154(b) by 702 days.

(21) Appl. No.: 14/808,730

(22) Filed: Jul. 24, 2015

(65) Prior Publication Data

US 2016/0092510 A1 Mar. 31, 2016

Related U.S. Application Data

(60) Provisional application No. 62/056,273, filed on Sep. 26, 2014.

(51) Int. Cl.
*G06F 16/24* (2019.01)
*G06F 16/2453* (2019.01)
*G06F 16/28* (2019.01)
*G06F 16/2455* (2019.01)

(52) U.S. Cl.
CPC .... *G06F 16/24542* (2019.01); *G06F 16/2455* (2019.01); *G06F 16/285* (2019.01)

(58) Field of Classification Search
CPC ......... G06F 17/30598; G06F 17/30463; G06F 16/285; G06F 16/2455; G06F 16/134; G06F 16/8373; G06F 2201/805
See application file for complete search history.

(56) References Cited

U.S. PATENT DOCUMENTS

| | | | |
|---|---|---|---|
| 7,321,993 B1 * | 1/2008 | Markle | G05B 23/0235 714/47.1 |
| 9,053,167 B1 * | 6/2015 | Swift | G06F 16/27 |
| 9,607,073 B2 * | 3/2017 | Schechter | G06F 17/30598 |
| 2012/0310916 A1 * | 12/2012 | Abadi | G06F 17/30445 707/713 |
| 2014/0082749 A1 * | 3/2014 | Holland | G06F 21/645 726/29 |
| 2014/0188840 A1 * | 7/2014 | Agarwal | G06F 17/30321 707/711 |

(Continued)

*Primary Examiner* — Apu M Mofiz
*Assistant Examiner* — Cindy Nguyen
(74) *Attorney, Agent, or Firm* — Patterson + Sheridan LLP

(57) ABSTRACT

Embodiments presented herein provide techniques for managing data in manufacturing systems. One embodiment includes receiving a set of data from a plurality of devices operating in a manufacturing environment. A portion of the set of data is written by a data management application to both a relational database and a distributed storage cluster that includes a plurality of storage nodes in a distributed computing environment. Upon receiving a query to extract a subset of data from the set of data, the query is analyzed to determine attributes of the query. Based, in part on the analysis, one of the relational database and the distributed storage cluster is selected for processing the query.

18 Claims, 6 Drawing Sheets

(56) References Cited

U.S. PATENT DOCUMENTS

| | | | | |
|---|---|---|---|---|
| 2014/0195558 A1* | 7/2014 | Murthy | ............. | G06F 17/30545 |
| | | | | 707/770 |
| 2015/0032684 A1* | 1/2015 | Gupta | ............... | G06F 17/30575 |
| | | | | 707/600 |
| 2016/0063030 A1* | 3/2016 | Chen | ................. | G06F 17/30569 |
| | | | | 707/714 |

* cited by examiner

OPTIMIZED STORAGE SOLUTION FOR REAL-TIME QUERIES AND DATA MODELING

CROSS-REFERENCE TO RELATED APPLICATION

This application claims benefit of U.S. Provisional Patent Application Ser. No. 62/056,273, filed on Sep. 26, 2014, and titled STORING, RETRIEVING & MANAGING SEMI-CONDUCTOR MANUFACTURING DATA IN A BIG DATA INFRASTRUCTURE, which is incorporated by reference herein in its entirety.

BACKGROUND

Field

Embodiments of the present disclosure generally relate to data management, and more particularly to optimized techniques for managing data in a manufacturing environment using both real-time queries and data modeling.

Description of the Related Art

In the manufacturing industry, the issues of data collection and information quality and thoroughness are increasingly becoming important concerns due, in part, to advances in modern manufacturing systems and the shrinking form factor of the devices. For example, through advances in data collection and data modeling, many manufacturers can accurately predict part failures, system optimizations, and the like. As manufacturing systems become more complex, the quality and completeness of collected data can play a decisive role in determining whether a particular analysis and subsequent action in a process is successful. This concern regarding data and information quality and thoroughness has naturally led to substantial increases in the amount of data that is involved in different manufacturing systems. The substantial rise in the amount of data is partly due to new developments in tool/equipment capabilities, advances in factory automation and drive to increase yields along with shrinking geometries. As such, with the rapid rise in the amount of data, manufacturers face challenges related to the management and use of the large amounts of data.

However, many manufacturing environments also leverage their data collection system for other purposes, e.g., equipment and process monitoring, etc. For example, temperature information collected from various sensors within the manufacturing environment could be queried by real-time monitoring applications for use in monitoring the status of the equipment or the quality of the output from the equipment in the manufacturing environment. As such, many manufacturers require a data storage system that is optimized for both real-time queries and data modeling operations. Thus, there is a need for improved methods for managing data in manufacturing systems that are subject to data that changes constantly and accumulates in large scale.

In manufacturing industries, and in particular, the semiconductor manufacturing industry, data requirements on data volumes, rates, quality, merging and analytics continue to increase, causing the rapid explosion in the amount of data that is used within these industries. Some of these requirements are due, in part, to advances in factory automation, improved tool capabilities, and the drive to improve yields. For example, advances in factory automation and improved tool capabilities, in general, have enabled the manufacture of semi-conductor chips and other various electronic devices that continue to shrink in size. However, this level of manufacturing typically requires high levels of precision of control which increases the amount of data that has to be monitored and analyzed within the manufacturing system. Additionally, the drive to improve yields has, in general, led to the incorporation of multiple systems within manufacturing environments that have allowed for more accurate models to be achieved. However, this also has tended to increase the amount of data as there are more co-existing systems in which data has to be monitored in order to produce accurate models. As such, manufacturers increasingly face challenges related to managing the large amounts of data within these systems.

Traditional techniques typically attempt to address these challenges with existing systems, such as relational database systems. However, in many cases, traditional relational technologies are simply unable to handle the large amounts of data involved in these advanced manufacturing systems. Further, even in cases where relational databases could handle large data sets, the use of relational databases would be cost-prohibitive due the large amounts of time that would be involved in the process of storing large sets of data and processing queries for the data from the relational database. Additionally, storage systems that are designed for processing large data volumes can be used (e.g., distributed filing systems). However, while these systems can be well-suited for extensive data mining, these systems are not capable of providing adequate real-time monitoring and analysis of advanced manufacturing systems.

SUMMARY

Embodiments disclosed herein include methods, systems, and computer program products for managing data in a manufacturing environment characterized, in part, by the use of large scale data sets.

In one embodiment, a method for managing data in a manufacturing environment is disclosed. The method includes receiving a set of data from a plurality of devices operating in a manufacturing environment. The method also includes writing, by a data management application, a first portion of the set of data to both a relational database and a distributed storage cluster, the distributed storage cluster comprising a plurality of storage nodes in a distributed computing environment. Upon receiving a query to be processed from the set of data, the query is analyzed to determine attributes of the query. One of the relational database and the distributed storage cluster is then selected for processing the query, based on a predefined relationship between the determined attributes of the query and the selected one of the relational database and the distributed storage cluster. The query is then submitted to the selected one of the relational database and the distributed storage cluster for execution.

Another embodiment provides a non-transitory computer-readable medium containing computer program code that, when executed, performs an operation. The operation includes receiving a set of data from a plurality of devices operating in a manufacturing environment. Additionally, the operation includes writing, by a data management application, a first portion of the set of data to both a relational database and a distributed storage cluster, the distributed storage cluster comprising a plurality of storage nodes in a distributed computing environment. The operation may also include, upon receiving a query to be processed from the set of data, analyzing the query to determine attributes of the query, and selecting one of the relational database and the distributed storage cluster for processing the query, based on a predefined relationship between the determined attributes of the query and the selected one of the relational database and the distributed storage cluster. Further, the operation may include submitting the query to the selected one of the relational database and the distributed storage cluster for execution.

Still another embodiment provides a manufacturing system. The manufacturing system includes a plurality of tools for manufacturing one or more semi-conductor devices, a first storage system, a second storage system, at least one processor and a memory. The first storage system includes a relational database and the second storage system includes a distributed storage cluster comprising a plurality of storage nodes in a distributed computing environment. The memory stores a computer program that, when executed by the at least one processor, performs an operation. The operation includes receiving a set of data from a plurality of devices operating in a manufacturing environment. Additionally, the operation includes writing, by a data management application, a first portion of the set of data to both a relational database and a distributed storage cluster, the distributed storage cluster comprising a plurality of storage nodes in a distributed computing environment. The operation also includes, upon receiving a query to be processed from the set of data, analyzing the query to determine attributes of the query, and selecting one of the relational database and the distributed storage cluster for processing the query, based on a predefined relationship between the determined attributes of the query and the selected one of the relational database and the distributed storage cluster. The operation further includes submitting the query to the selected one of the relational database and the distributed storage cluster for execution.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

Figure 1:
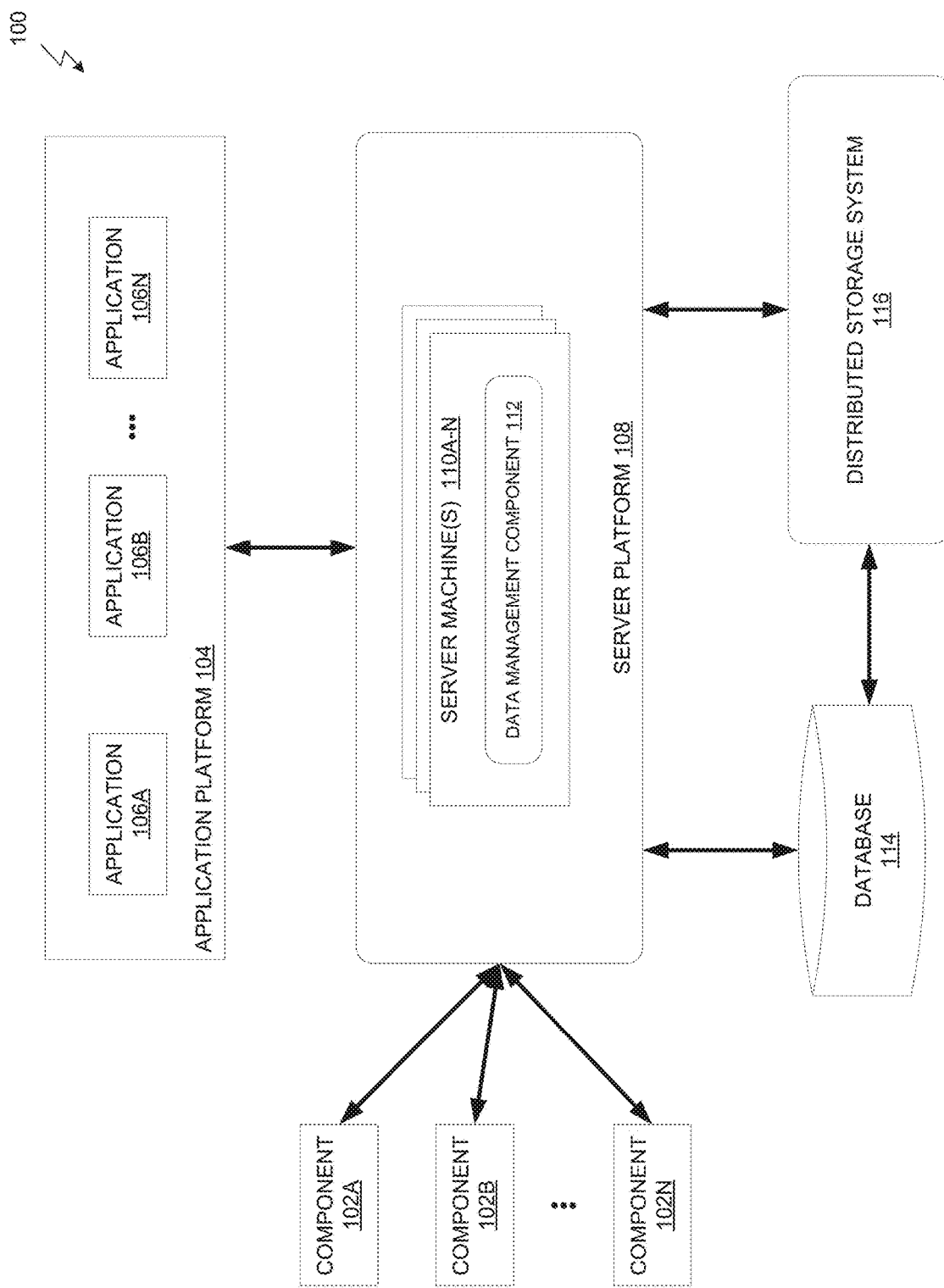
FIG. 1 illustrates a block diagram of an example architecture of a manufacturing system that includes a plurality of data management components, in accordance with embodiments of the present disclosure.

To facilitate understanding, identical reference numerals have been used, wherever possible, to designate identical elements that are common to the Figures. Additionally, it is contemplated that elements disclosed in one embodiment may be beneficially used in other embodiments described herein without specific recitation.

DETAILED DESCRIPTION

Embodiments presented herein present methods, computer-program products, and systems for the support of extensive data mining (e.g., for building models) as well as real-time model execution and maintenance. As will be described in more detail below, embodiments presented herein provide optimal co-existence and cooperation of both distributed storage systems and relational databases. The techniques presented herein also provide for optimal management of data in both the relational database system and distributed storage system, based on the particular applications requesting the data in the manufacturing environment. As such, the embodiments presented herein allow for advanced manufacturing systems to run more efficiently and with greater control compared to traditional techniques.

One embodiment includes a method for managing data in a manufacturing environment characterized, in part, by large scale data sets. The method includes receiving a set of data from a plurality of devices operating in a manufacturing environment. A first portion of the set of data is written, by a data management application, to both a relational database and a distributed storage cluster. Generally, the distributed storage cluster includes a plurality of storage nodes in a distributed computing environment and logic for distributing data across the plurality of storage nodes (e.g., using a load balancing algorithm). Upon receiving a query to be processed from the set of data, a query processing component can analyze the query to determine attributes of the query. The query processing component can then select one of the relational database and the distributed storage cluster for processing the query, based on a predefined relationship between the determined attributes of the query and the selected one of the relational database and the distributed storage cluster. The query is then submitted to the selected data storage system (i.e., the relational database or the distributed storage cluster) for execution. Doing so provides an optimized storage solution that can efficiently process both real-time queries (e.g., for monitoring components in a manufacturing environment) as well as data modeling queries (e.g., generating a data model using data values collected across a substantial period of time).

FIG. 1 is a block diagram illustrating an architecture 100, in which aspects of the present disclosure may be practiced. For example, as will be described in more detail below, the techniques presented herein allow for the co-existence of the database 114 and the distributed storage system 116 within the architecture 100. Doing so in this manner allows for efficient and optimal real-time analysis and modeling of the different components 102A-N within architecture 100. In one embodiment, the architecture 100 is an example of a manufacturing system (or environment), such as a semiconductor manufacturing system.

As shown, the architecture 100 includes a server platform 108 that includes a plurality of server machines 110A-N. Each server machine 110A-N includes a data management component 112, respectively. The data management component 112, in general, represents logic (e.g., a software application, device firmware, an ASIC, etc.) that is configured to implement one or more of the techniques presented herein. For example, the data management component 112 could perform method 400 illustrated in FIG. 4 and/or method 500 illustrated in FIG. 5.

In the depicted embodiment, a database 114 and a distributed storage system 116 co-exist within the architecture 100 and are connected to the each of the server machines 110A-N in the server platform 108. According to one embodiment, the database 114 represents an example of a relational database. For example, the relational database could be an Oracle® database or other type of database that organizes data based on the traditional relational model. Generally, the distributed storage system 116 represents an example of a distributed storage cluster that includes a plurality of storage nodes distributed across a computing environment, as well as logic for distributing data across the plurality of storage nodes. For example, the distributed storage cluster could be a storage system that uses an Apache™ Hadoop® based technology, such as a Hadoop Distributed Filing System (HDFS). More generally, however, any storage cluster where information is stored across a plurality of nodes can be used, consistent with the functionality described herein.

As will be described in more detail below, the data management component 112 is generally configured to receive one or more sets of data from the components 102A-N. The components 102A-N, in some embodiments, can represent tools, equipments, systems, chambers, pumps, etc., that are used for one or more manufacturing processes within the architecture 100. Upon receiving the one or more sets of data, the data management component 112 is configured to write portions of the set of data to both the database 114 and the distributed storage system 116.

Advanced manufacturing systems typically support various different applications related to processing real-time queries and data modeling. Some of these applications include real-time collection and analysis of run-time data, prediction modeling to support maintenance and control of different manufacturing subsystems, and others. Thus, within these systems, the manufacturing data can be characterized by multiple signatures depending on its use by the particular application. To facilitate storage efficiency and better query performance within these systems (as compared to traditional relational technologies), different storage structures are utilized based on the type of data that is received. For example, in some embodiments, the data management component 112 is configured to write portions of the sets of data that meet one or more predefined types of data to one or both of the data storage systems (e.g., the database 114 and/or the distributed storage system 116). Storing data in both the database 114 and the distributed storage system 116 provides the manufacturing system with greater flexibility in real-time operation and control, as well as in data modeling. For example, the data stored in the database 114 can be used for real-time analysis and control of the manufacturing system. Meanwhile, the same data that is stored in the distributed storage system 116 can be used for extensive data modeling, which can be used to improve applications that perform real-time analysis and control. Storing, by the data management application, data in the distributed storage system 116 can also avoid additional burden on the database 114 to send the data to the distributed storage system 116.

Alternatively or additionally, storing different types of data in only the database 114 or only the distributed storage system 116 can also provide greater flexibility (as compared to traditional techniques) in the control of the manufacturing system. For example, certain types of manufacturing data can be relatively static (i.e., not subject to being constantly changed) and small (e.g., such as data that characterizes the number of components within the manufacturing system). Thus, this type of data may only be stored in the database 114. In other cases, certain types of data used for maintenance, diagnostics, and tracing, etc. (which are related to prediction modeling) can be expensive to maintain for long periods of time. Thus, this type of data may only be stored in the distributed storage system, which can significantly reduce the cost associated with storing this type of data. In this manner, storing (by the database management component 112) data into one or both different types of data storage systems, based on certain types of data, provides greater flexibility in the control of the manufacturing system, as compared to traditional relational technologies.

As mentioned above, the data that is received by the data management component 112 can be representative of different types of data associated with the architecture. For example, in one embodiment, the data that is received by the data management component 112 can be representative of run-time data (e.g., monitoring data) associated with the real-time operation of each of the components 102A-N. In some embodiments, the data management component 112 can also generate additional data, such as analysis data, from the monitoring data. In yet other embodiments, the data that is received by the data management component 112 can represent configuration data that includes information related to the configuration of the architecture 100 (e.g., the number of components 102A-N, the number of chambers, number of applications 106A-N, etc., within the architecture 100). In still other embodiments, the data that is received by the data management component 112 can represent any combination of the above different types of data.

As also shown, the data management component 112 is also configured to interact with one or more applications 106A-N that are located in application platform 104. The applications 106A-N, in general, represent different applications, systems, etc. used for advanced control, predictive applications (e.g., based on modeling) and/or management of the different components 102A-N within the architecture 100. For example, one or more of the applications 106A-N that are related to advanced control may include applications for fault detection, run-to-run (R2R) control, etc. Additionally, one or more of the applications 106A-N that are related to predictive applications may include applications for predictive maintenance, yield prediction, virtual metrology, and the like. Further, one or more of the applications 106A-N that are related to management may include applications for maintenance management, inventory management, yield management, and the like.

As will be described in more detail below with reference to FIG. 3, the data management component 112 is configured to receive one or more queries for data from the applications 106A-N. Upon receiving the query, the data management component 112 is configured to analyze one or more attributes of the query and select one of the database 114 and distributed storage systems (cluster) 116 for processing the query, based on a predefined relationship between attributes of the query and the selected one of the database 144 and the distributed storage system 116. The selection, by the database management component 112, of one of the database 114 and distributed storage system 116 is transparent to user or run-time system. For example, in some embodiments, the data management component 112 may determine, based on one or more mapping rules, that queries for data from applications related to real-time analysis or control should be processed by the database 114 (e.g., as relational databases are in general more suited for real-time data analysis) rather than the distributed storage system 116. Likewise, in other embodiments, the data management component 112 may determine, based on one or more mapping rules, that queries for data from applications related to reporting and/or simulation should be processed by the distributed storage system 116 (e.g., as distributed filling systems are generally more suited for storing high volume amounts of data) rather than the database 114. After selecting one of the database 114 and the distributed storage cluster 116, the data management component 112 then submits the query to the selected storage system for execution.

Figure 2:
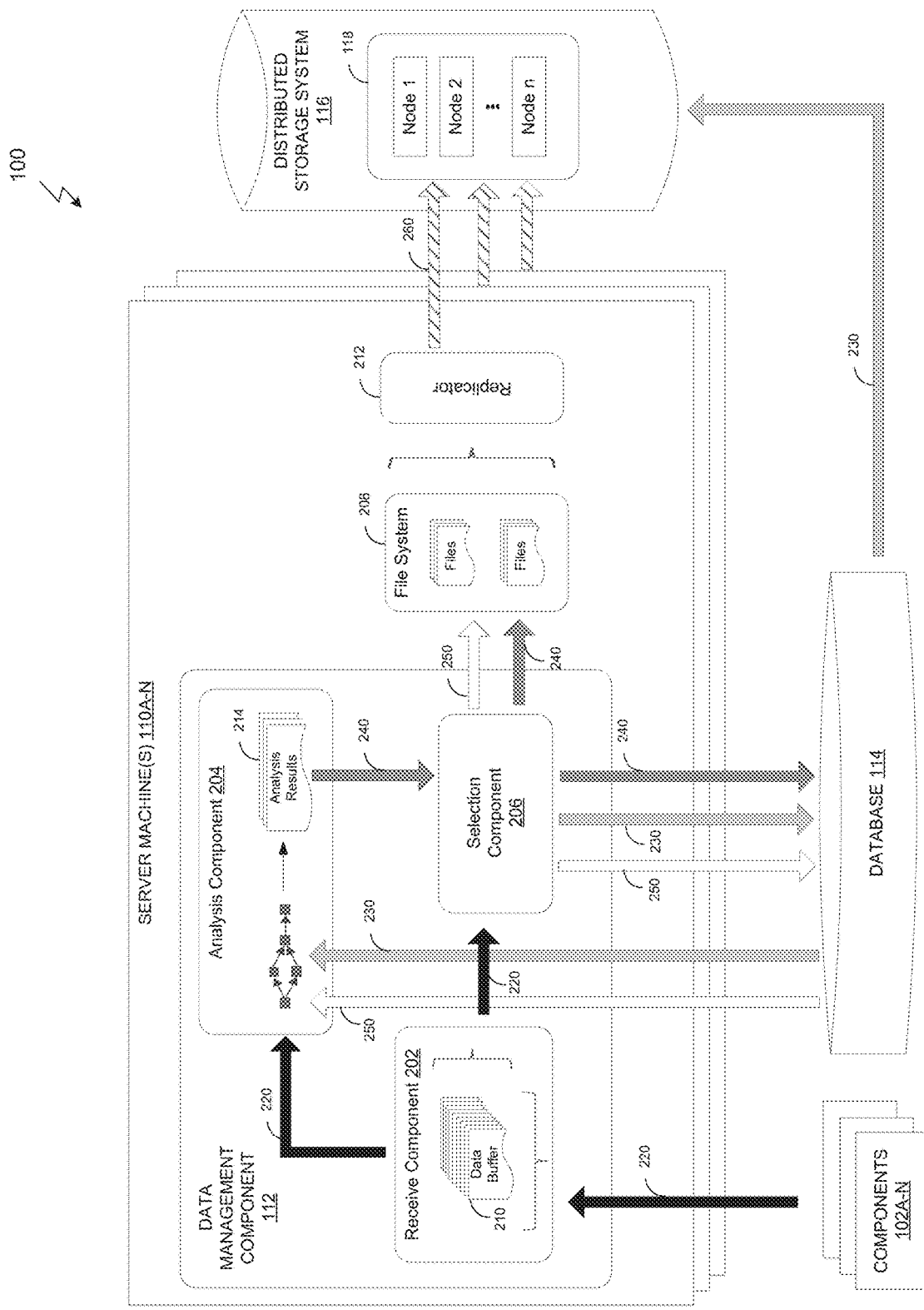
FIG. 2 illustrates a block diagram of a data management component within a server machine, in accordance with embodiments of the present disclosure

FIG. 2 illustrates a block diagram of a data management component 112 that is configured to implement one or more of the techniques presented herein, according to one embodiment. As shown, the data management component 112 includes receive component 202, analysis component 204, and selection component 206. The receive component 202 is configured to receive a set of data 220 from one or more components 102A-N. In one embodiment, upon receiving the set of data 220, the receive component 202 writes the set of data 220 to a buffer 210, and upon determining that a threshold amount of data (e.g., such as 'n' number of accumulated records, etc.) is stored within the buffer, the receive component 202 transmits the set of data 220 within the buffer 210 to the analysis component 204 and the selection component 206. Alternatively or additionally, in another embodiment, upon receiving the set of data 220, the receive component 202 initiates a timer (not shown) that is configured to expire after a predefined period of time, and upon expiration of the timer, the receive component 202 transmits the set of data 220 within the buffer 210 to the analysis component 204 and the selection component 206.

The selection component 206, upon receiving the set of data 220, determines whether one or more portions of the set of data 220 correspond to different predefined types of data (e.g., monitoring, analysis, configuration, etc.), and based on the determined type, writes each portion of the set of data to either both the database 114 and the distributed storage system 116 or only the database 114. For example, as mentioned above, upon determining that one or more portions of the set of data 220 include monitoring data 250, the selection component writes the monitoring data 250 to both the database 114 and to the distributed storage system 116. However, upon determining that one or more portions of the set of data includes configuration data 230, the selection component writes the configuration data 230 to only the database 114.

The data management component 112 could also be configured to generate (via the analysis component 204) one or more additional sets of data based on the set of data 220. The one or more additional sets of data can represent data obtained from performing different types of analysis on the received set of data 220, which can be used to improve the real-time operation and/or data modeling performed by the manufacturing system. Examples of the different types of analysis can include, but are not limited to, real-time fault detection, univariate (UVA) analysis, and the like. As shown, the data received by the analysis component 204 includes the set of data 220 (e.g., obtained from the components 102A-N), and various types of data received from the database 114 (e.g., configuration data 230, monitoring data 250, and other types of data). Upon receiving this data, the analysis component 204 is configured to generate one or more additional sets of data (represented by analysis results 214). The analysis component 204 then transmits the analysis results 214 in the form of analysis data 240 to the selection component 206. The selection component 206, upon receiving the analysis data 240, writes the analysis data 240 to both the database 114 and to the distributed storage system 116.

According to some embodiments, the configuration data 230 that is stored in the database 114 can be periodically replicated and stored in the distributed storage system 116. In one embodiment, the replication may occur periodically based on a predetermined time interval, may occur periodically based on a varying time interval (e.g., determined by the database management component 112) or may occur based on a trigger (e.g., upon a user manually updating the configuration data stored in the database). Of course, one of ordinary skill in the art will recognize that such an example is provided for illustrative purposes only, and more generally, embodiments may be configured to replicate other types of data from the database system 114 to the distributed storage system 116, and vice versa.

As discussed above, the selection component 206 can write data directly to the distributed storage system 116. The distributed storage system 116, upon receiving the data, can then employ logic for distributing the data across the plurality of storage nodes 118 (e.g., using a load balancing algorithm, such as round robin load balancing, random choice load balancing, workload-based load balancing, and so on). In a particular embodiment (which is shown), the selection component 206 is configured to write data to the file system 208, which organizes the data (e.g., based on data 250 and data 260) into a plurality of files. The replicator 212 is configured to replicate all or a part of the files across one or more nodes of the plurality of nodes, such that the files do no overload any one of the nodes 1-$n$ within the distributed storage system 116. In particular, the replicator 212 can also employ a load balancing algorithm (e.g., in addition to the load balancing algorithm employed by the distributed storage system) to write to one of multiple different controllers for the distributed storage system 116. For example, using the load balancing algorithm, the replicator 212 can determine an amount of controllers needed to successfully distribute the files across the distributed storage system 116. The replicator 212 can employ one or more different metrics (e.g., such as size of the files, number of files, types of data within the files, number of nodes within the distributed storage system, etc.) for determining how many controllers to write the data to. The controllers can then distribute all or a part of the data across the plurality of nodes 118 within the distributed storage system 116. Doing so in this manner enables multiple tiers of load balancing which further reduces the chances of any one of the nodes within the distributed storage system 116 overloading. It should be noted that although the file system 208 and the replicator 212 are shown external to the data management component 112, in some embodiments, the file system 208 and the replicator 212 can also be within the data management component 112.

Aspects of the present disclosure also allow for the removal (or purging) of data stored within each of the database 114 and the distributed storage system (cluster) 116. For example, in some cases, purging of data within each of the database 114 and the distributed storage system 116 may be desirable in cases where duplicated data is not needed either because the data is no longer needed by certain applications, data is no longer suitable for the particular type of storage, and/or other considerations. In this embodiment (not shown), the data that is stored within each of the database 114 and the distributed storage system 116 can be purged from each of the systems, based on the age of the data stored within each of the systems. For example, a first predetermined age can be defined for the database 114 and a second predetermined age can be defined for the distributed storage system 116. In an embodiment, the first predetermined age is different from the second predetermined age, and the first predetermined age is set to a lower value than the second predetermined age. For example, the first predetermined age can be set to a value that is more suitable for relational type databases, which typically are not associated with long term storage of data. Likewise, the second predetermined age can be set to a value that is more suitable for distributed storage systems, which generally are better suited (compared to relational databases) at storing data for long-term. Upon data reaching the first predetermined age in the database 114, the stored data within the database 114 is automatically purged. Similarly, upon data reaching the second predetermined age in the distributed storage system 116, the stored data within the distributed storage system 116 is automatically purged. Note, however, that, in these embodiments, purging within one storage system (e.g., database 114) is independent from the purging in the other storage system (e.g., distributed storage system 116).

Figure 3:
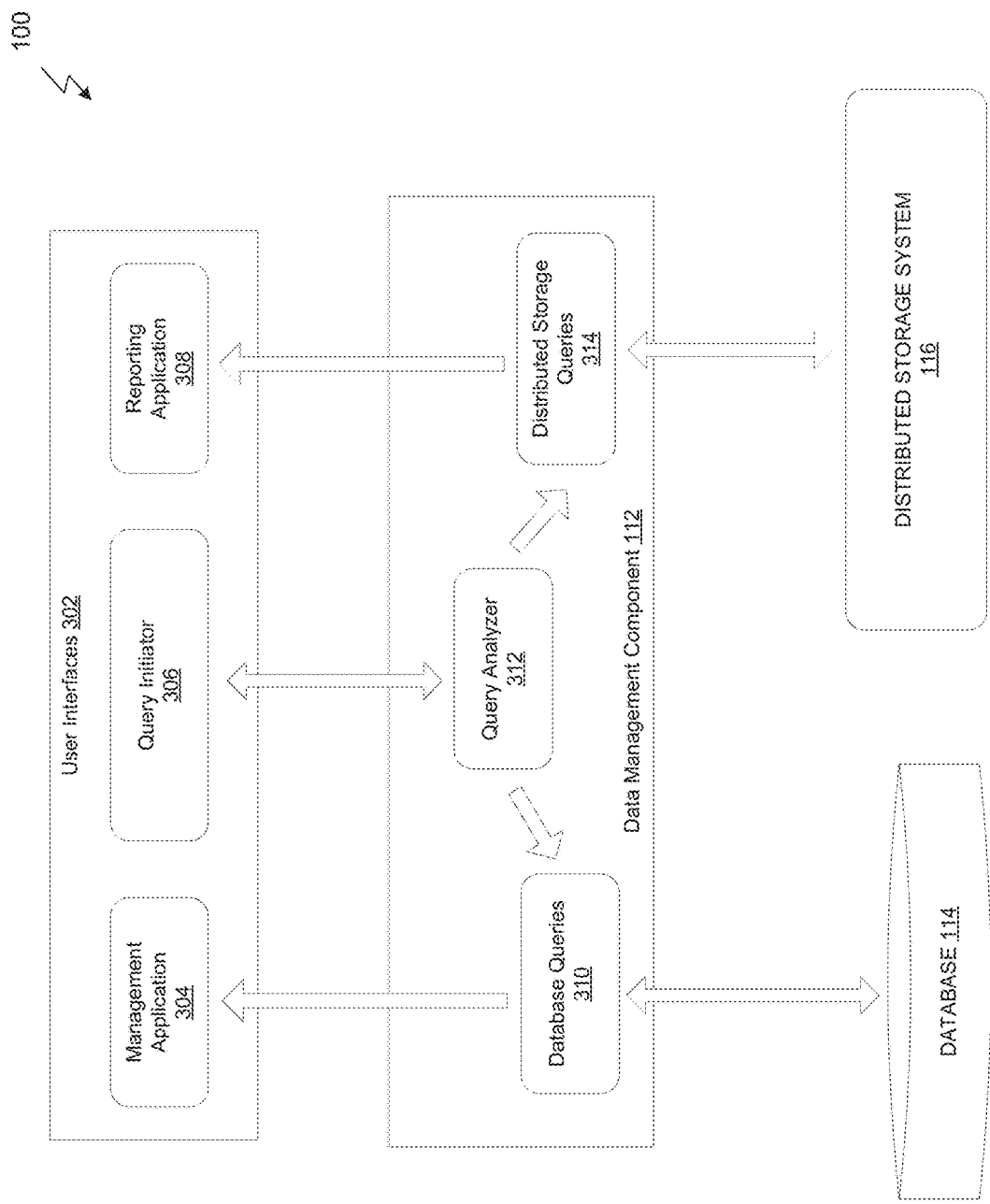
FIG. 3 illustrates a block diagram of a data management component configured to receive one or more queries for data, in accordance with embodiments of the present disclosure.

FIG. 3 illustrates a block diagram of a data management component configured to receive one or more queries for data, according to one embodiment. As shown, the data management component 112 also includes one or more query processing components, such as query analyzer 312, database queries submitter 310 and distributed storage queries submitter 314. As shown in the depicted embodiment, one or more queries for data are submitted (via the query initiator 306 of a user interface 302) to the query analyzer 312. Upon receiving the queries, the query analyzer 312 analyzes the query to determine attributes of the query. Examples of different attributes for a given query that can be determined include, but are not limited to, the type of data (e.g., age, real-time data, configuration data, etc.) requested within the query, the particular application requesting the query, the use case for the query, and others. After determining the attributes of the query, the query analyzer 312 selects one of the database 114 and the distributed storage system 116 for the processing the query, based on a predefined relationship between the determined attributes of the query and the selected one of the database 114 and the storage cluster 116.

For example, the query analyzer 312 could define one or more mapping rules for determining which queries should be submitted to the different data storage systems. In some cases, the mapping rules could be manually defined (e.g., by a user or administrator). In other cases, the query analyzer 312 could learn over a period of time which data storage system is more efficient at executing a given type of query. Based on this information, the query analyzer 312 could then update the mapping rules and subsequently forward the queries to the determined data storage system based on the determination.

In one embodiment, the query analyzer could determine (e.g., based on a mapping rule) that data queries for real-time analysis data time-critical analysis data and/or control data should be submitted to the database 114 for processing. Likewise, the query analyzer 312 could determine that data queries for configuration changes (e.g., specifying what analysis needs to be performed, what data to collect, what actions needed on fault detection, etc.) should also be submitted to the database 114 for processing.

On the other hand, the query analyzer 312 could determine (e.g., based on a mapping rule) that queries for data to be used for reports and/or simulations should be submitted to the distributed storage system 116. Further, in the event the query analyzer can not determine which application is requesting data for a given query, the query analyzer 312 can make an appropriate query request to either one of the database 114 or the distributed storage system 116, based on the type of data (e.g., age) and the particular storage type.

As shown in FIG. 3, upon selecting the storage cluster 116 for processing the query, the query analyzer 312 submits the query (via distributed storage queries submitter 314) to the distributed storage system 116. The distributed storage queries submitter 314 then returns the data requested within the query to a reporting application 308. On the other hand, upon selecting the database 114 for processing the query, the query analyzer 312 submits the query (via database queries submitter 310) to the database 114. The database queries submitter 310 then returns the data requested within the query to a management application 304.

Figure 4:
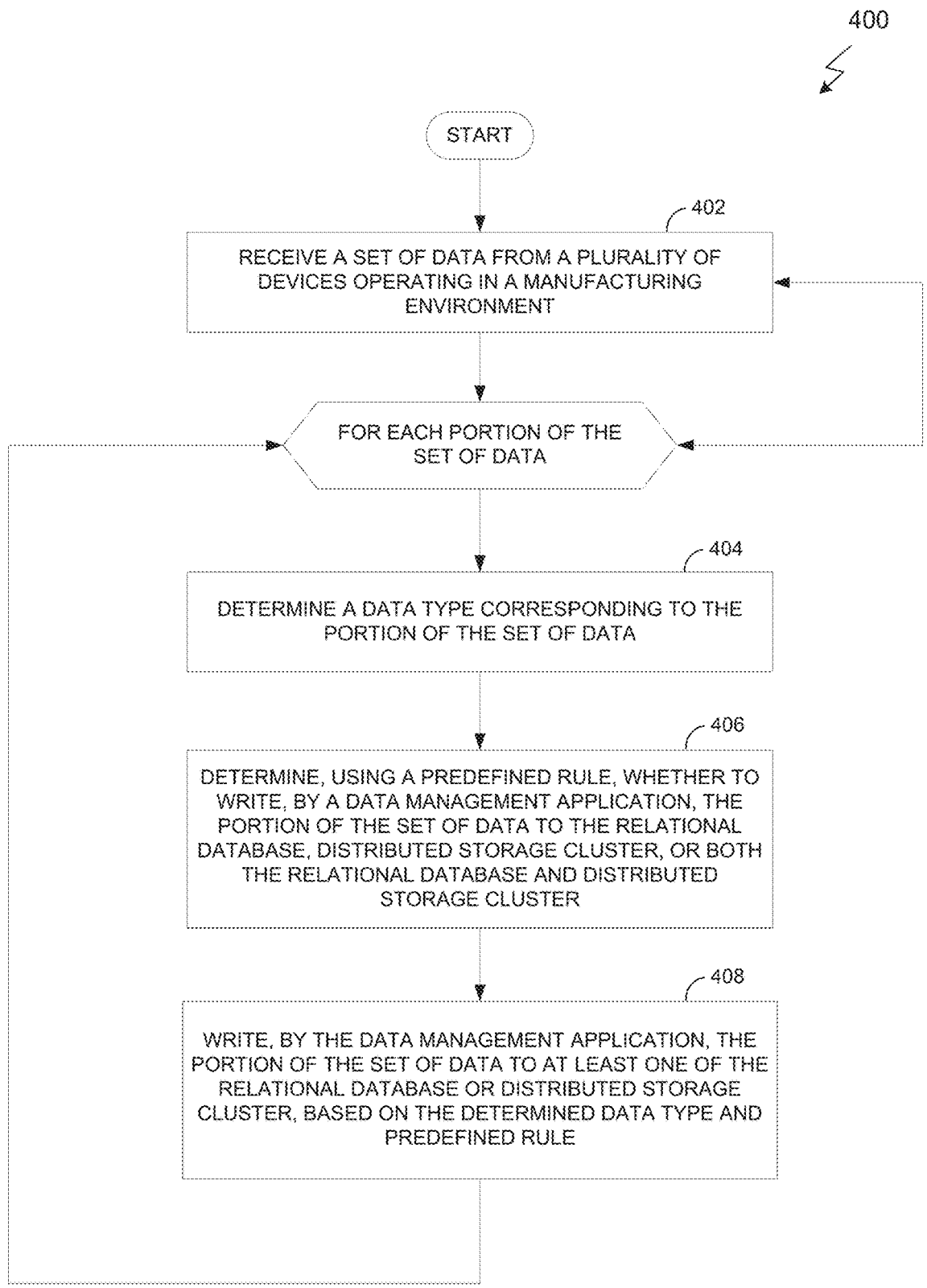
FIG. 4 is a flow diagram illustrating a method for managing data in a manufacturing environment, in accordance with embodiments of the present disclosure.

FIG. 4 is a flow diagram of a method 400 for managing data in a manufacturing system characterized, in part, by large scale data sets. As shown, the method begins at block 402, where a data management component 112 (or application) receives a set of data from a plurality of devices operating in a manufacturing environment. For each portion of the set of data, the data management component 112 determines a data type corresponding to the portion of the set of data (block 404). For example, as mentioned above, the respective portion of the set of data could include configuration data (e.g., the number of components 102A-N, the number of chambers, the number of applications 106A-N, etc., within the manufacturing system), monitoring data, analysis data, and other types of data.

At block 406, the data management component 112 determines, using a predefined rule, whether to write the portion of the set of data to a relational database (e.g., such as database 114), distributed storage cluster comprising a plurality of storage nodes in a distributed computing environment (e.g., such as distributed storage system 116), or both the relational database and distributed storage cluster. For example, as mentioned above, the data management component 112 could determine (e.g., based on a predefined rule) that all data except for configuration data should be written to both the database 114 and distributed storage system 116, whereas configuration data should be written to only the database 114. Note, however, that while the present embodiment uses configuration data as an example of a type of data written solely to the relational database, more generally embodiments can be configured to write any sort of data to solely one of the database 114 and the distributed storage system 116. Returning to the method 400, at block 408, the data management component 112 writes the portion of the set of data to at least one of the relational database or distributed storage cluster, based on the determined data type and predefined rule.

Figure 5:
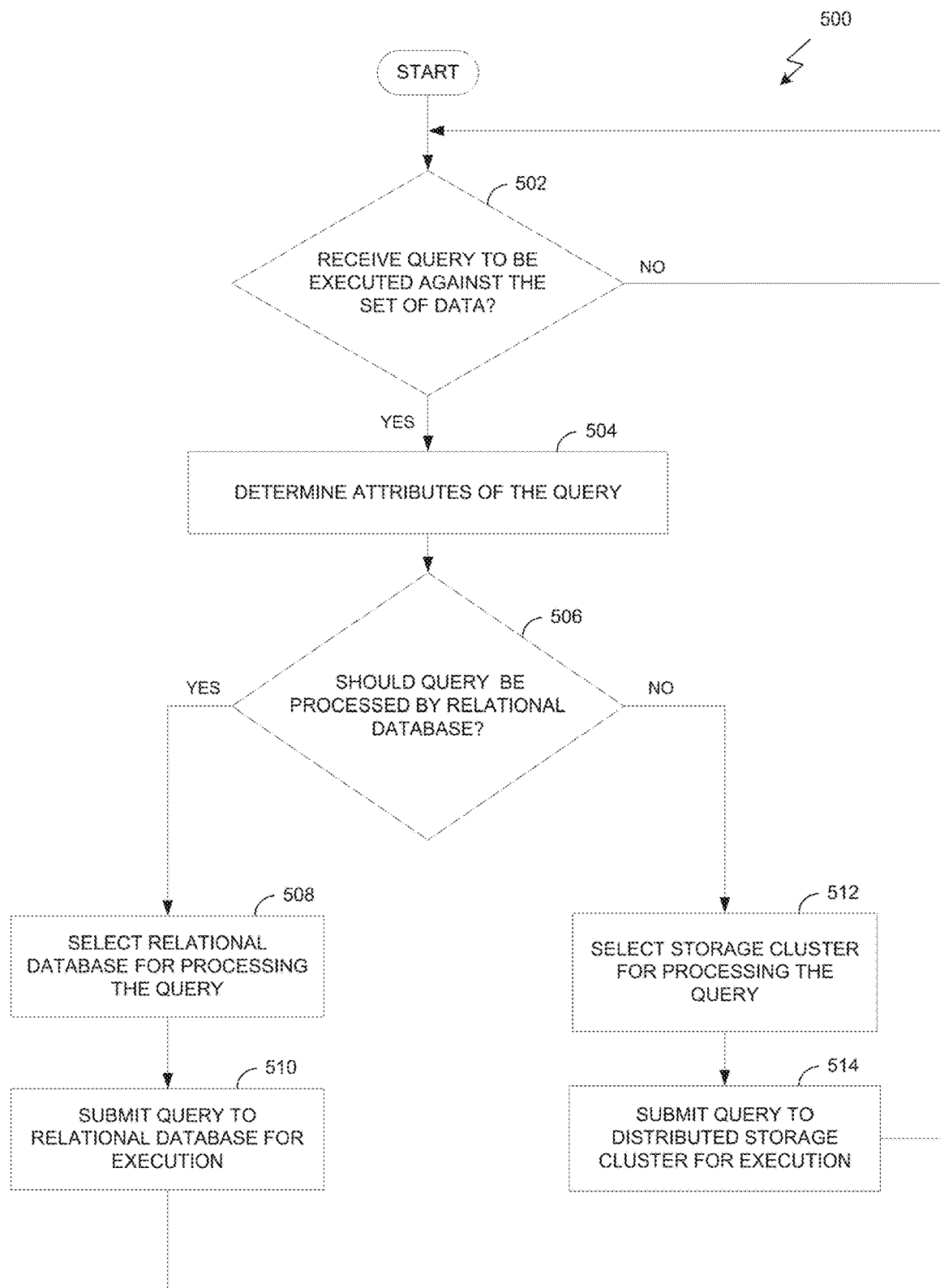
FIG. 5 is a flow diagram illustrating a method for processing queries in a manufacturing environment, in accordance with embodiments of the present disclosure.

FIG. 5 is a flow diagram of a method 500 for processing queries in a manufacturing system, according to one embodiment. As shown, the method 500 begins at block 502, where the data management component 112 determines whether a query to be executed against the set of data (stored in one of the data storage systems) was received. If so, the data management component 112 proceeds to block 504 to determine one or more attributes of the query. Based on the determined attributes, the data management component 112 determines (based on one or more mapping rules) whether the query should be processed by the relational database (block 506). For example, in one embodiment, if the data management component 112 determines (at block 504) that the query is for one of real-time analysis or control, the data management component 112 determines (at block 506) the query should be processed by the relational database. In one embodiment, if the data management component 112 determines (at bock 504) that the query is for one of reporting or simulation, the data management component 112 determines the query should be processed by the distributed storage cluster. In one embodiment, if the data management component 112 determines (at block 504) that the query is requesting data that is lower than a predefined age, the data management component 112 determines that the query should be processed by the relational database. Similarly, in another embodiment, if the data management component 112 determines (at block 504) that the query is requesting data that is greater than a predefined age, the data management component 112 determines that the query should be processed by the distributed storage cluster.

Returning to the method 500, if the data management component 112 determines (at block 506) that the query should be processed by the relational database, the data management component 112 selects (at block 508) the relational database for processing the query and submits (at block 510) the query to the relational database for execution. However, if the data management component 112 determines (e.g., based on one or more mapping rules) that the query should be processed by the distributed storage cluster, the data management component 112 selects (at block 512), the distributed storage cluster for processing the query and submits (at block 514) the query to the storage cluster for execution.

Figure 6:
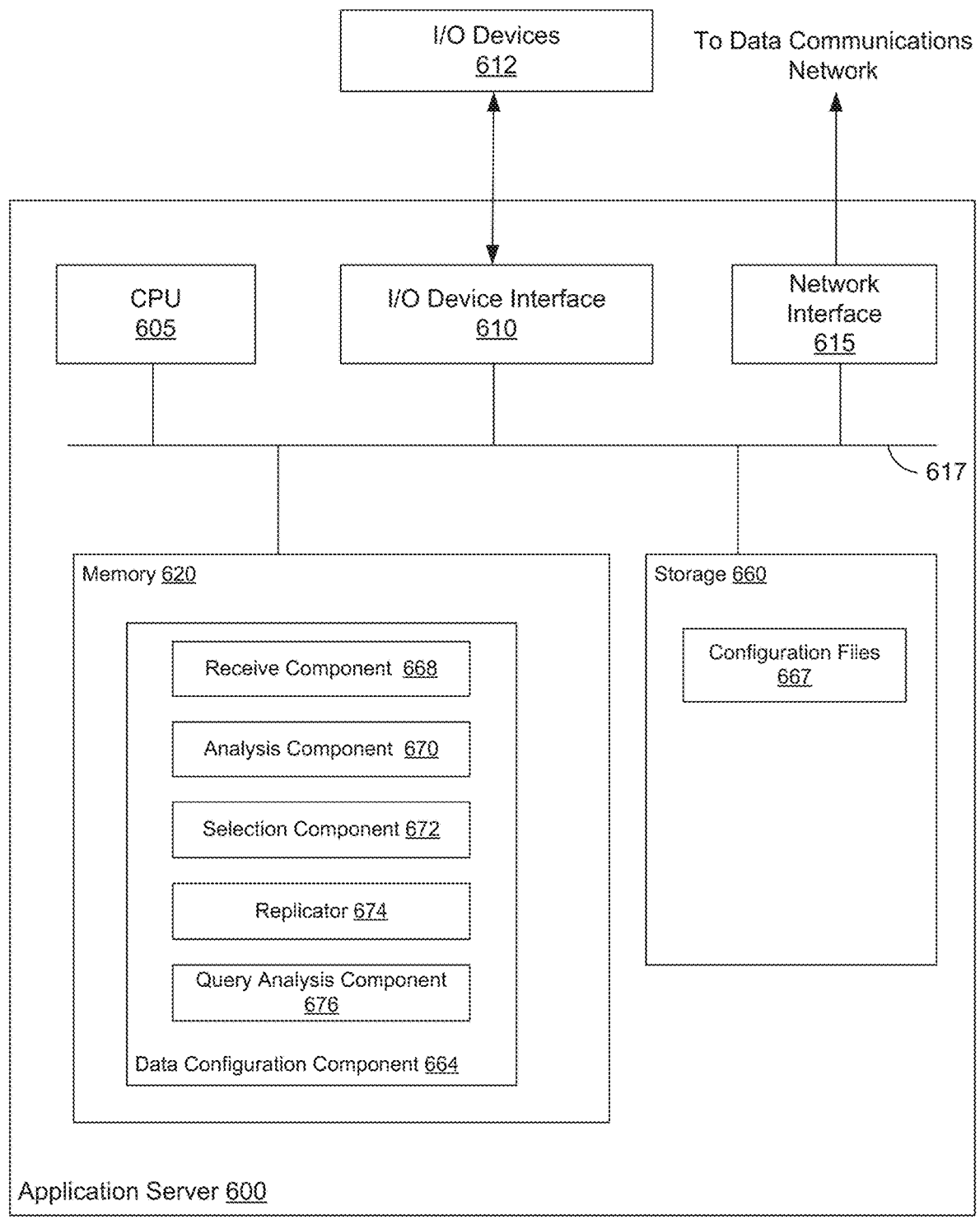
FIG. 6 is a block diagram of an example application server computing system configured with a data management component, in accordance with embodiments of the present disclosure.

FIG. 6 illustrates an application server computing system 600 configured to manage data resources in a manufacturing environment, according to on embodiment. As shown the computing system 600 includes, without limitation, a central processing unit (CPU) 605, a network interface 615, a memory 620, and storage 660, each connected to a bus 617. The computing system 600 may also include an I/O device interface 610 connecting I/O devices 612 (e.g., keyboard, mouse, and display devices) to the computing system 600. Further, in context of this disclosure, the computing elements shown in the computing system 600 may correspond to a physical computing system (e.g., a system in a data center) or may be a virtual computing instance executing within a computing cloud.

The CPU 605 retrieves and executes programming instructions stored in the memory 620 as well as stores and retrieves application data residing in the memory 620. The interconnect 617 is used to transmit programming instructions and application data between CPU 605, I/O devices interface 610, storage 660, network interface 617, and memory 620. Note, CPU 605 is included to be representative of a single CPU, multiple CPUs, a single CPU having multiple processing cores, and the like. Memory 620 is generally included to be representative of a random access memory. Storage 660 may be a disk drive storage device. Although shown as a single unit, storage 660 may be a combination of fixed and/or removable storage devices, such as fixed disc drives, removable memory cards, or optical storage, network attached storage (NAS), or a storage area-network (SAN).

Illustratively, the memory 620 includes a data management component 664 that is configured to manage data resources in a manufacturing environment. The data management component 664 includes a receive component 668, an analysis component 670, a selection component 672, a replicator 674, and a query analysis component 674. The storage 660 includes configuration files 667.

In one embodiment, the receive component 668 receives data from one or more components in the manufacturing environment and provides the data to the analysis component 670 and the selection component 672. The analysis component 670 uses the data to generate additional data that is then also provided to the selection component 672. The selection component 672 determines whether to write to the received data (from the receive component 668 and the analysis component 670) to both a relational database and a distributed storage system or only to the relational database. When writing to the distributed storage system, replicator 672 is configured to distribute the data intended to be distributed across the plurality of nodes within the distributed storage system to reduce the load on each of the plurality of nodes.

In one embodiment, the query analysis component 674 receives one or more queries, determines attributes of the queries and selects one of the relational database and distributed storage system for processing the query, based, in part, on a predefined relationship between the determined attributes of the query and the selected one of the relational database and the distributed storage cluster.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, C #, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A method, comprising:
    receiving a set of data from a plurality of devices operating in a manufacturing environment;
    separately writing a first portion of the set of data to both a relational database and a distributed storage cluster, the distributed storage cluster comprising a plurality of storage nodes in a distributed computing environment;
    upon receiving a query to be processed from the set of data:
        analyzing the query to determine an application from which the query was received;
        selecting one of the relational database and the distributed storage cluster for processing the query, based on a mapping rule that defines a predefined relationship between a type of the application from which the query was received and the selected one of the relational database and the distributed storage cluster, wherein the mapping rule specifies that queries from applications related to real-time operations are to be processed by the relational database; and
        submitting the query to the selected one of the relational database and the distributed storage cluster for execution;
    purging the first portion of the set of data from the relational database upon the stored first portion of the set of data in the relational database reaching a first age; and
    purging the first portion of the set of data from the distributed storage cluster upon the stored first portion of the set of data in the distributed storage cluster reaching a second age, wherein the first age and the second age are different, and wherein the first age is lower than the second age.

2. The method of claim 1, wherein the distributed storage cluster comprises a Hadoop Distributed Filing System (HDFS).

3. The method of claim 1, wherein a data management application directly writes the first portion of the set of data to both the relational database and the distributed storage cluster, and wherein the first portion of the set of data comprises data representative of real-time operation of the manufacturing environment and data obtained from analyzing the real-time data.

4. The method of claim 1, further comprising:
    selectively writing a second portion of the set of data to only the relational database, based on a predefined relationship between a data type corresponding to the second portion of the set of data and the relational database.

5. The method of claim 4, wherein the second portion of the set of data comprises configuration data.

6. The method of claim 1, wherein selecting one of the relational database and the distributed storage cluster for processing the query comprises:

upon determining that the query is for at least one of real-time analysis or control of the manufacturing environment, selecting the relational database for processing the query; and upon determining that the query is for at least one of reporting or simulation of the manufacturing environment, selecting the distributed storage cluster for processing the query.

7. The method of claim 1, further comprising:
upon receiving the set of data, writing the set of data to a buffer; and
upon determining that a threshold amount of data is stored within the buffer:
   selecting one of the relational database and the distributed storage cluster; and
   writing the data stored in the buffer to the selected one of the relational database and the distributed storage cluster.

8. The method of claim 1, further comprising:
upon receiving the set of data:
   writing the data to a buffer; and
   initiating a timer configured to expire after a predefined period of time; and
upon expiration of the timer:
   selecting one of the relational database and the distributed storage cluster; and
   writing the data stored in the buffer to the selected one of the relational database and the distributed storage cluster.

9. The method of claim 1, wherein writing the first portion of the set of data to the distributed storage cluster comprises replicating the first portion of the set of data across the plurality of storage nodes in the distributed storage cluster.

10. The method of claim 5, further comprising:
replicating the configuration data; and
writing the replicated configuration data to the distributed storage cluster.

11. A non-transitory computer-readable medium containing computer program code that, when executed, performs an operation comprising:
receiving a set of data from a plurality of devices operating in a manufacturing environment;
separately writing a first portion of the set of data to both a relational database and a distributed storage cluster, the distributed storage cluster comprising a plurality of storage nodes in a distributed computing environment;
upon receiving a query to be processed from the set of data:
   analyzing the query to determine an application from which the query was received;
   selecting one of the relational database and the distributed storage cluster for processing the query, based on a mapping rule that defines a predefined relationship between a type of the application from which the query was received and the selected one of the relational database and the distributed storage cluster, wherein the mapping rule specifies that queries from applications related to real-time operations are to be processed by the relational database; and
   submitting the query to the selected one of the relational database and the distributed storage cluster for execution;
purging the first portion of the set of data from the relational database upon the stored first portion of the set of data in the relational database reaching a first age; and purging the first portion of the set of data from the distributed storage cluster upon the stored first portion of the set of data in the distributed storage cluster reaching a second age, wherein the first age and the second age are different, and wherein the first age is lower than the second age.

12. The non-transitory computer-readable medium of claim 11, further comprising:
selectively writing a second portion of the set of data to only the relational database, based on a predefined relationship between a data type corresponding to the second portion of the set of data and the relational database.

13. The non-transitory computer-readable medium of claim 11, wherein selecting one of the relational database and the distributed storage cluster for processing the query comprises:
upon determining that the query is for at least one of real-time analysis or control of the manufacturing environment, selecting the relational database for processing the query; and
upon determining that the query is for at least one of reporting or simulation of the manufacturing environment, selecting the distributed storage cluster for processing the query.

14. The non-transitory computer-readable medium of claim 11, wherein writing the first portion of the set of data to the distributed storage cluster comprises replicating the first portion of the set of data across the plurality of storage nodes in the distributed storage cluster.

15. The non-transitory computer-readable medium of claim 12, further comprising:
replicating the second portion of the set of data; and
writing the replicated second portion of the set of data to the distributed storage cluster.

16. A manufacturing system comprising:
a plurality of tools for manufacturing one or more semiconductor devices;
a first storage system comprising a relational database;
a second storage system comprising a distributed storage cluster, the distributed storage cluster comprising a plurality of storage nodes in a distributed computing environment;
at least one processor; and
a memory containing a program that, when executed by the at least one processor, performs an operation comprising:
   receiving a set of data from the plurality of tools;
   separately writing a first portion of the set of data to both the relational database and the distributed storage cluster;
   upon receiving a query to be processed from the set of data:
      analyzing the query to determine an application from which the query was received;
      selecting one of the relational database and the distributed storage cluster for processing the query, based on a mapping rule that defines a predefined relationship between a type of the application from which the query was received and the selected one of the relational database and the distributed storage cluster, wherein the mapping rule specifies that queries from applications related to real-time operations are to be processed by the relational database; and submitting the query to the selected one of the relational database and the distributed storage cluster for execution;

purging the first portion of the set of data from the relational database upon the stored first portion of the set of data in the relational database reaching a first age; and purging the first portion of the set of data from the distributed storage cluster upon the stored first portion of the set of data in the distributed storage cluster reaching a second age, wherein the first age and the second age are different, and wherein the first age is lower than the second age.

17. The manufacturing system of claim 16, wherein a data management application directly writes the first portion of the set of data to both the relational database and the distributed storage cluster, and wherein the operation further comprises:

selectively writing a second portion of the set of data to only the relational database.

18. The manufacturing system of claim 16, wherein selecting one of the relational database and the distributed storage cluster for processing the query comprises:

upon determining that the query is for at least one of real-time analysis or control of the manufacturing environment, selecting the relational database for processing the query; and upon determining that the query is for at least one of reporting or simulation of the manufacturing environment, selecting the distributed storage cluster for processing the query.

* * * * *